(12) United States Patent
Koning

(10) Patent No.: US 11,014,223 B2
(45) Date of Patent: May 25, 2021

(54) TIRE INFLATION AND PRESSURE MONITORING TOOL

(71) Applicant: Bradley Koning, Alto, MI (US)

(72) Inventor: Bradley Koning, Alto, MI (US)

( * ) Notice: Subject to any disclaimer, the term of this patent is extended or adjusted under 35 U.S.C. 154(b) by 82 days.

(21) Appl. No.: 16/675,905

(22) Filed: Nov. 6, 2019

(65) Prior Publication Data

US 2020/0361068 A1 Nov. 19, 2020

Related U.S. Application Data

(60) Provisional application No. 62/849,289, filed on May 17, 2019.

(51) Int. Cl.
*G01L 17/00* (2006.01)
*B25B 27/00* (2006.01)
*B60S 5/04* (2006.01)

(52) U.S. Cl.
CPC .......... *B25B 27/0057* (2013.01); *B60S 5/043* (2013.01); *G01L 17/00* (2013.01)

(58) Field of Classification Search
None
See application file for complete search history.

(56) References Cited

U.S. PATENT DOCUMENTS

| | | | |
|---|---|---|---|
| 3,827,635 A | 8/1974 | Krakowski et al. | |
| 6,468,047 B1 | 10/2002 | Huang et al. | |
| 7,611,127 B1 | 11/2009 | Moore | |
| 7,913,551 B2 | 3/2011 | Bucknell | |
| 2008/0216617 A1 | 9/2008 | Goodine | |
| 2010/0200260 A1 | 8/2010 | Mikami et al. | |
| 2011/0172821 A1 | 7/2011 | Carter | |
| 2013/0082816 A1 | 4/2013 | Pusateri et al. | |
| 2015/0165602 A1 | 6/2015 | Seith et al. | |

FOREIGN PATENT DOCUMENTS

| | | |
|---|---|---|
| GB | 2279604 A | 1/1995 |
| GB | 2351931 A | 1/2001 |

*Primary Examiner* — Lisa M Caputo
*Assistant Examiner* — Nigel H Plamb
(74) *Attorney, Agent, or Firm* — Oppenhuizen Law PLC; David L. Oppenhuizen

(57) ABSTRACT

A tire inflation and pressure monitoring tool includes a handheld power tool having a manually-activated switch and a rotationally-driven bit. The switch is selectively operated to drive the bit either clockwise or counterclockwise. The bit is configured to be engageable with and retain a valve stem cover on a tire valve stem. The tool further includes a tire inflator having a first end, a second end, a hollow void extending along the length. The first end and the second end are in fluid communication with one another. The first end has an air chuck for delivering air into a tire via a tire valve stem, while the second end is configured to receive pressurized air from a source of compressed air. The tire inflator further has a pressure gauge for displaying a pressure of air inside the tire inflator.

9 Claims, 2 Drawing Sheets

TIRE INFLATION AND PRESSURE MONITORING TOOL

CROSS REFERENCE TO RELATED APPLICATION

This application claims the benefit of U.S. Provisional Application 62/849,289, which was filed on May 17, 2019, the disclosure of which is hereby incorporated by reference.

BACKGROUND OF THE INVENTION

1. Field of the Invention

The present invention pertains to a tire inflation and pressure monitoring tool for facilitating an inflation of a tire. More particularly, the present invention pertains to a tire inflation tool having a tire inflator for filling air inside a tire, and a power tool for installing and removing a valve stem cover from a valve stem of the tire.

2. Description of the Prior Art

Most motorized vehicles use inflatable tires in order to cushion shocks and vibrations encountered in driving. Most of these inflatable tires have a valve stem connected to a valve to which an air chuck is temporarily attached in order to fill air inside the tire. The tires also include a valve stem cover that is in a threaded engagement with the valve stem to cover an air opening of the valve stem. In use, the valve stem cover is unscrewed or disengaged from the valve stem prior to engaging the air chuck with the valve stem for inflating the tire. Typically, an operator removes the valve stem cover from the valve stem manually, which is especially time consuming when many tires need to be inflated and/or have their pressure checked. Specifically, a tire pressure maintenance process for a fleet of vehicles may be time and labor intensive, and thus may remain inefficient, if an individual manually unscrews or screws the valve stem cover from the valve stem for checking a tire pressure and/or filling the air inside the tire.

SUMMARY OF THE INVENTION

According to an aspect of the disclosure, a tire inflation and pressure monitoring tool is disclosed. The tool includes a handheld power tool having a manually-activated switch and a rotationally-driven bit. The switch and the bit are cooperatively configured whereby the switch is selectively operated to drive the bit either clockwise or counterclockwise. The bit is configured to be engageable with and retain a valve stem cover on a tire valve stem. The tool further includes a tire inflator having a first end and a second end, and a hollow void extending along the length thereof. The first end and the second end are in fluid communication with one another. The first end has an air chuck configured to deliver air into a tire via the tire's valve stem, and the second end is configured to receive pressurized air from a source of compressed air. The tire inflator further includes a pressure gauge configured to display the pressure of air inside the tire inflator.

For a more complete understanding of the present invention, reference is made to the following detailed description and accompanying drawings. In the drawings, like reference characters refer to like parts throughout the views in which:

DETAILED DESCRIPTION OF A PREFERRED EMBODIMENT

Figure 1:
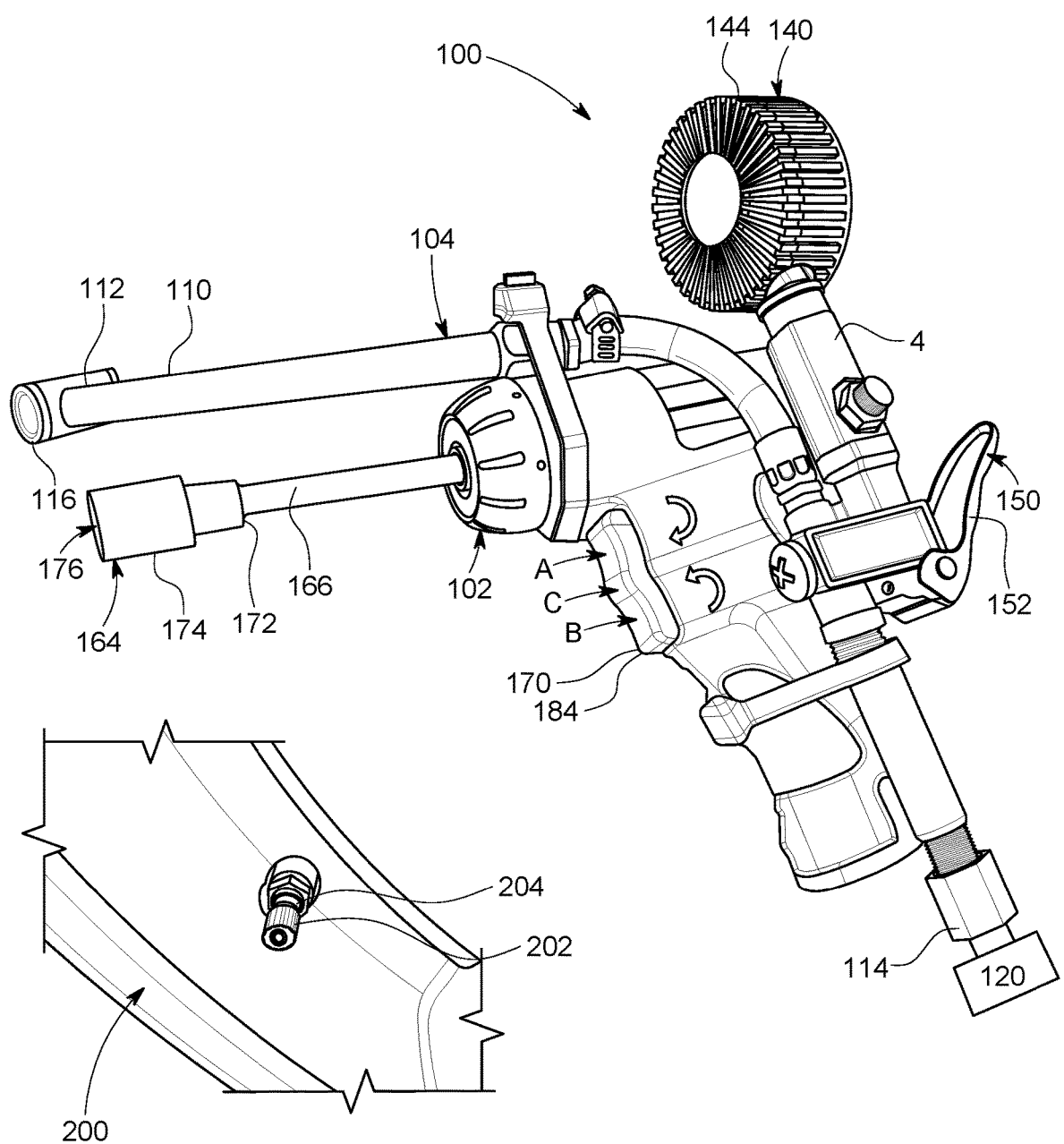
FIG. 1 illustrates a perspective view of a tire inflation and pressure monitoring tool having a tire inflator and a hand held power coupled to the tire inflator, in accordance with an embodiment of the disclosure.
Figure 2:
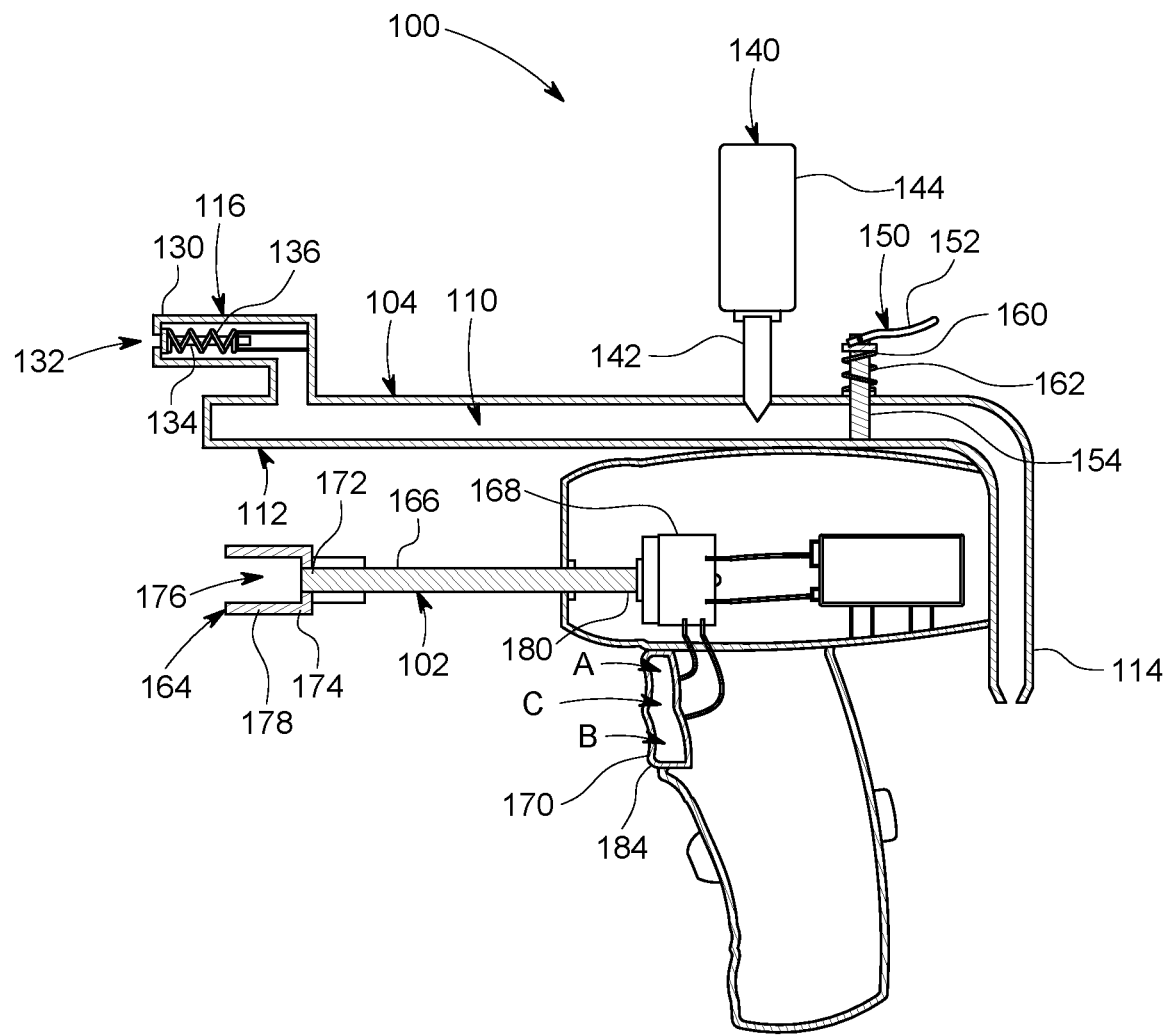
FIG. 2 illustrates a sectional schematic view of the tire inflation and pressure monitoring tool, in accordance with an embodiment of the disclosure.

Referring to FIGS. 1 and 2, an exemplary tire inflation and pressure monitoring tool 100 (hereinafter referred to as a tool 100) suitable for filling a tire 200 with air is shown. The tool 100 includes a handheld power tool 102 (hereinafter referred to as a driver 102) for removing a valve stem cover 202 from a valve stem 204 of the tire 200, and a tire inflator 104 for filling the air inside the tire 200 through the valve stem 204. The tire inflator 104 is adapted to attach or engage with the valve stem 204 for inflating the tire 200 with air. The tire inflator 104 may include a hollow conduit 110 having a first end 112 and a second end 114, and an air chuck 116 disposed at the first end 112 which is in fluid communication with the hollow conduit 110. The second end 114 of the hollow conduit 110 is adapted to be coupled to an air source 120, such as a compressor, to receive the compressed or pressurized air, while the air chuck 116 is adapted to be attached to the valve stem 204 for providing the compressed air to the tire 200, and hence filling the tire 200 with air.

The air chuck 116 may include a nozzle 130 having an opening 132, and a valve body 134 movably or slidably disposed inside the nozzle 130 for selectively opening and closing the opening 132. In an implementation, the valve body 134 may be biased by a spring 136 to a first position in which the opening 132 is closed. The valve body 134 may be adapted to move to a second position when the air chuck 116 is engaged with the valve stem 204. In the second position, the valve body 134 moves away from the opening 132, thereby facilitating a flow of air from the air chuck 116 to the tire 200 via the valve stem 204. Although an air chuck 116 having a nozzle 130 and a valve body 134 is contemplated, it may be appreciated that any type of air chuck known in the art is envisioned, and the scope of the tire inflator 104 of the present disclosure is not limited by the structure, configuration, and assembly of the disclosed air chuck 116.

The tire inflator 104 also includes a pressure gauge 140 for measuring or monitoring the pressure of air inside the tire 200. The pressure gauge 140 is in fluid communication with the hollow conduit 110, and is adapted to measure and display the air pressure inside the hollow conduit 110. In an exemplary implementation, the pressure gauge 140 may include a probe 142, which interacts with the air flowing through the hollow conduit 110 to measure the pressure of air, and a dial gauge 144 for indicating a value of pressure of air acting on the probe 142. Preferably, although not necessarily, at least a portion of the probe 142 extends inside the hollow conduit 110 to facilitate an interaction of air with the probe 142. In certain other implementations, the tire inflator 104 may include a first passage (not shown) for directing at least a portion of air flowing inside the hollow conduit 110 to the probe 142 for facilitating a measurement of the pressure of the air. Although a pressure gauge having a probe and a mechanical dial gauge is envisioned, it may be appreciated that any other type of pressure gauge, such as, but not limited to, a digital pressure gauge having a pressure sensor and a digital indicator may also be contemplated.

Further, the tire inflator 104 may include a valve 150 (hereinafter referred to as a first valve 150) to control the flow of air from the air source 120 (i.e. second end 114) to the air chuck 116 (i.e. the first end 112). The first valve 150 may be disposed upstream of the pressure gauge 140, and may be located downstream of the second end 114 of the hollow conduit 110. In an embodiment, the first valve 150 is a manually operated valve and may be operated or actuated to a first position and a second position. In the first position, the first valve 150 is adapted to prevent the flow of air from the air source 120 (i.e. the second end 114) to the air chuck 116, while in the second position, the first valve 150 is adapted to allow the flow of air from the air source 120 (the second end 114) to the air chuck 116. In an exemplary embodiment, the first valve 150 may include a manually operated lever 152 for moving the first valve 150 between the first position and the second position. In an implementation, as shown in FIG. 2, the first valve 150 may include a stem 154 coupled to the lever 152 and adapted to slide or move inside the hollow conduit 110 to allow or prevent a flow of air between the air chuck 116 and the air source 120 (i.e. between the first end 112 and the second end 114) In the first position of the first valve 150, the stem 154 may be adapted to extend inside the hollow conduit 110 so as to block or prevent a flow of air from the air source 120 to the air chuck 116, while in the second position of the first valve 150, the stem 154 may retract, at least partially, so as to allow the flow of air from the air source 120 to the air chuck 116 through the hollow conduit 110. In another implementation, not shown, the stem 154 may include a disk-shaped structure. In such a case, the disk-shaped structure may be disposed normal to the flow of air when the first valve 150 is in the first position, while the disk-shaped structure may be disposed parallel to the flow of air when the first valve 150 is in the second position. Further, in an embodiment, the first valve may be biased to the first position by a biasing member 160, such as a spring 162. In such a case, a person may operate and hold the lever 152 to move the first valve 150 to the second position, and the first valve 150 may move to the first position when the lever 152 is released by the operator. Although a manually actuated first valve is contemplated, other types of valves such as an electromechanical valve, a hydromechanical valve, an electrohydraulic valve, or any other such valve known in the art, are also envisioned.

In addition, the driver 102 may include a bit 164 adapted to engage with the valve stem cover 202, a shaft 166 connected with the bit 164, a motor 168 operatively coupled with the shaft 166 and adapted to rotate the shaft 164 (and hence the bit 164), and a manually-operated switch 170 for controlling a rotation and/or operation of the motor 168. The bit 164 may be disposed at a first end 172 of the shaft 166, and is adapted to rotate with a rotation of the shaft 166. The bit 164 is preferably removably coupled to the first end 172 of the shaft 166 and is coaxial with the shaft 166. Further, as shown, the bit 164 includes a cylindrical body 174 defining an elongated opening 176 to receive the valve stem cover 202. In an embodiment, the cylindrical body 174 may be an elastomeric body 178 for facilitating a retention of the valve stem cover 202 inside the elongated opening 176. In such a case, the elastomeric body 178 is expanded when the valve stem cover 202 is placed inside the elongated opening 178, and thereby facilitating the retention of the valve stem cover 202 inside the bit 164. In certain implementations, the bit 164 may include a plurality of projections (not shown) for facilitating an engagement of the valve stem cover 202 with the bit 164 and retention of the valve stem cover inside the bit 164. Also, each projection may extend radially inwardly inside the elongated opening 178 from an inner surface of cylindrical body 174. Alternatively, the inner surface of the cylindrical body 174 may include a shape complimentary to a shape of an outer surface of the valve stem cover 202 for facilitating a frictional engagement and retention of the valve stem cover 202 with the bit 164. For example, the inner surface of the bit 164 may include a circular shape complimentary to the outer surface of the valve stem cover 202.

In an embodiment, the bit 164 is rotated counterclockwise to unscrew or remove the valve stem cover 202 from the valve stem 204. Conversely, the bit 164 is rotated clockwise for screwing or engaging the valve stem cover 202 onto the valve stem 204. The shaft 166 is selectively rotated in a counterclockwise or clockwise direction by the motor 168, which is attached to a second end 180 of the shaft 166. Preferably the motor 168 is an electric motor. Alternatively, the motor 168 may be a fluid motor, such as a pneumatic motor. In such a case, the motor 168 may be operated by compressed air received from the air source 120. According to this embodiment, the tool 100 may include a valve (not shown) for controlling a flow of air from the air source 120 to the motor 168. In a scenario, the valve may be a 3-way valve to selectively control the flow of air from the air source 120 to the motor 168 and/or the air chuck 116. In such a case, the valve, when actuated to a first position, allows the flow of air from the air source 120 to the air chuck 116, while blocking the flow of air to the motor 168. Further, the valve, when actuated to a second position, allows the flow of air from the air source 120 to the motor 168, while blocking the flow of air to the air chuck 116.

To facilitate and control the rotation of the motor 168 in clockwise and counterclockwise directions, the switch 170 may be moved to a first position "A" and a second position "B" by an operator. In an embodiment, the switch 170 may be a three-position rocker switch 184 configured to be operated by the operator. In the first position "A," the switch 170 enables the clockwise rotation of the motor 168, thereby rotating the bit 164 in a clockwise direction. Likewise, when the switch 170 is moved to the second position "B," then the counterclockwise rotation of the motor 168 rotates the bit 164 counterclockwise. Further, a rotation of the motor 160 is disabled when the switch 170 is moved to the third position "C." Any other suitable type of switch may be contemplated, such as a basic on/off trigger switch, and in which case, there may be an additional directional switch or lever (not shown) which determines the rotation of the bit 164.

In addition, although the tire inflator 104 and the driver 102 are shown to be assembled together in the drawings using a tie, it may be appreciated that the various components of the tire inflator 104 and the driver 102 may be assembled in a single common housing.

Furthermore, in another embodiment the tool may be provided with the driver 102 and lacking the tire inflator tool 104. In this embodiment, the tool is used only for quickly removing and installing valve stem covers.

An operation of the tool 100 is now explained. For facilitating an inflation of the tire 200, the operator engages the bit 164 of the driver 102 with the valve stem cover 202 such that valve stem cover 202 is received within the elongated opening 178 of the bit 164. Thereafter, the operator moves the switch 170 to the second position, thereby rotating the bit 164 (and the valve stem cover 202) in a counterclockwise direction. The valve stem cover 202 is disengaged from the valve stem 204, and the valve stem cover 202 is retained inside the bit 164 due to either a frictional engagement of the inner surface of the cylindrical body 174 of the bit 164 with the outer surface of the valve stem cover 202, or due to the elastomeric compression of the expanded cylindrical body 174 around the bit 164.

Once the valve stem cover 202 has been disengaged from the valve stem 204, the operator then engages the tire inflator 104 with the tire 200 by engaging the air chuck 116 with the valve stem 204. In an embodiment, the operator may then push the air chuck 116 towards the valve stem 204 so as to enable a fluid communication between the air chuck 116 and the valve stem 204. The operator may then operate the lever 152 to move the first valve 150 from the first position (default position) to the second position, thereby allowing pressurized air to flow from the air source 120 to the air chuck 116, and subsequently into the tire 200 via the valve stem 204. In this manner, the tire 200 is inflated by the tire inflator 104.

Further, during the inflation of the tire 200 or otherwise, the operator may desire to check the pressure of air inside the tire 200. In doing so, the operator may release the lever 152 to move the first valve 150 to the first position, thereby blocking the flow of air between the air source 120 and the air chuck 116. In such a scenario, the pressure measured by the pressure gauge 140 corresponds to the pressure of the air inside the tire 200. Therefore, the operator may check or monitor the pressure of air inside the tire 200 by observing a reading of the dial gauge 144.

The operator may then press or operate the lever 152 to move the first valve 150 to the second position to allow the filling of air inside the tire 200 when the pressure gauge 140 indicates a value of pressure less than a threshold value. The operator disengages the air chuck 116 from the valve stem 204 when the pressure gauge 140 indicates a pressure at or above the threshold value. The operator then engages the bit 164 with the valve stem 204 such that the valve stem cover 202 engages with the valve stem 204. The operator moves the switch 170 to the first position, which rotates the bit 164 in a clockwise direction, thereby screwing the valve stem cover 202 back onto the valve stem 204.

In this manner, the tool 100 facilitates a reduction in time required for monitoring the tire pressure and/or filling of air inside the tire 200 by reducing the time required for unscrewing and screwing of the valve stem cover 202. Further, the tool 100 reduces or eliminates the chance of losing the valve stem cover 202 since the valve stem cover 202 is retained within the bit 164. Also, since the tire inflator 104, the driver 102, and the pressure gauge 140 are combined in a single tool, there is no need to change between various tools for inflating the tire and/or monitoring tire pressure. Thus, the tool 100 provides a reduction in the overall time required for tire pressure monitoring and/or tire inflation, and hence increasing efficiency of the process.

It should be understood that the foregoing description is only illustrative of the aspects of the disclosed embodiments. Various alternatives and modifications can be devised by those skilled in the art without departing from the aspects of the disclosed embodiments. Accordingly, the aspects of the disclosed embodiments are intended to embrace all such alternatives, modifications, and variances that fall within the scope of the appended claims. Further, the mere fact that different features are recited in mutually different dependent or independent claims does not indicate that a combination of these features cannot be advantageously used, such as a combination remaining within the scope of the aspects of the disclosed embodiments.

What is claimed is:

1. A tire inflation and pressure monitoring tool, the tool comprising:
   a handheld power tool having a manually-activated switch, a rotationally-driven bit, and an electric motor configured to rotate the bit, the switch and the bit being cooperatively configured whereby the switch is selectively operated to drive the bit in either clockwise or counterclockwise directions, the bit further being configured to engage with and retain a valve stem cover on a tire valve stem; and
   a tire inflator having a first end and a second end, the tire inflator including a hollow void extending along the length thereof, and the first end and the second end being in fluid communication with one another, the first end having an air chuck configured to deliver air into a tire via the tire valve stem, and the second end being configured to receive pressurized air from an externally-located source of compressed air, the tire inflator further having a pressure gauge configured to display the pressure of air inside the tire inflator, and a manually-operated valve to selectively open or close the fluid communication between the first end and the second end, the valve including a manually-operated lever configured to move the valve between a first open position and a second closed position, the valve further including a stem that is coupled to the lever and adapted to slide out of the hollow void of the tire inflator to allow a flow of air in the first open position, or to slide into the hollow void to block a flow of air in the second closed position, the valve further including a spring coupled with the stem and the lever to bias the valve to the closed position.

2. The tool of claim 1, wherein the bit includes a cylindrical inner wall defining a void for frictionally retaining the valve stem cover.

3. The tool of claim 2, wherein the switch is a three-way rocker switch in which the switch's three positions are associated with (1) driving the bit clockwise, (2) driving the bit counterclockwise, and (2) a stationary position in which the bit does not rotate.

4. The tool of claim 1, wherein the bit comprises a resiliently deformable elastomeric material to frictionally engage and retain the valve stem cover.

5. The tool of claim 4, wherein the switch is a three-way rocker switch in which the switch's three positions are associated with (1) driving the bit clockwise, (2) driving the bit counterclockwise, and (2) a stationary position in which the bit does not rotate.

6. The tool of claim 4, wherein the bit includes a cylindrical inner wall defining a void for frictionally retaining the valve stem cover.

7. The tool of claim 6, wherein the switch is a three-way rocker switch in which the switch's three positions are associated with (1) driving the bit clockwise, (2) driving the bit counterclockwise, and (2) a stationary position in which the bit does not rotate.

8. The tool of claim 1, wherein the switch is a three-way rocker switch in which the switch's three positions are associated with (1) driving the bit clockwise, (2) driving the bit counterclockwise, and (2) a stationary position in which the bit does not rotate.

9. The tool of claim 1 wherein the externally-located source of compressed air is an air compressor.

\* \* \* \* \*